(No Model.) 2 Sheets—Sheet 1.

P. W. GATES.
BEARING FOR GYRATING SHAFTS FOR STONE BREAKERS OR OTHER MACHINES.

No. 525,410. Patented Sept. 4, 1894.

Witnesses
Severance
W. Harry Muzzy

Inventor
Philetus Warren Gates
by Mason, Fenwick and Lawrence
his Attorneys (No Model.) 2 Sheets—Sheet 2.

P. W. GATES.
BEARING FOR GYRATING SHAFTS FOR STONE BREAKERS OR OTHER MACHINES.

No. 525,410. Patented Sept. 4, 1894.

Witnesses
Severance.
W. Harry Muzzy.

Inventor
Philetus Warren Gates
by Mason, Fenwick & Lawrence
his Attorneys

UNITED STATES PATENT OFFICE.

PHILETUS WARREN GATES, OF CHICAGO, ILLINOIS, ASSIGNOR TO THE GATES IRON WORKS, OF SAME PLACE.

BEARING FOR GYRATING SHAFTS FOR STONE-BREAKERS OR OTHER MACHINES.

SPECIFICATION forming part of Letters Patent No. 525,410, dated September 4, 1894.

Application filed November 9, 1893. Serial No. 490,414. (No model.)

*To all whom it may concern:*

Be it known that I, PHILETUS WARREN GATES, a citizen of the United States, residing at Chicago, in the county of Cook and State of Illinois, have invented certain new and useful Improvements in Bearings for Gyrating Shafts for Stone-Breakers or other Machines; and I do hereby declare the following to be a full, clear, and exact description of the invention, such as will enable others skilled in the art to which it appertains to make and use the same.

My invention relates to improvements in supporting journals for the shafts of gyratory stone crushers or breakers, and has particularly to do with shafts which are supported or suspended at their upper ends, and receive their gyratory motion by means of eccentric bearing boxes embracing and carrying their lower ends, and the objects of my invention, are, first, to provide a suspending, supporting and sustaining bearing for the upper end of a gyratory shaft carrying a crusher head, said upper end being so constructed with relation to the bearings, that the fulcrum point of the gyrating shaft will be located in said bearing and below the suspending portion of the same, and thus a leverage secured, wherewith the suspending portion of said support is caused to move on the bearing ring and the shaft gyrated with less expenditure of power than if the leverage aforesaid, for aiding in moving the suspending portion of the bearing, was not provided; second, to so construct the cap and bearing ring, hereinafter described, that the changing bearing surfaces between them, will be, at all times, an equal distance from the fulcrum point of the shaft; third, to provide perfect lubrication for the shaft support and bearing; and fourth, to provide means whereby facilities are afforded for adjusting the shaft and crusher head for crushing the rock fine or coarse, and compensating for wear.

The foregoing will be more fully understood by reference to the following specification and claims and the accompanying drawings, in which latter—

Figure 1:
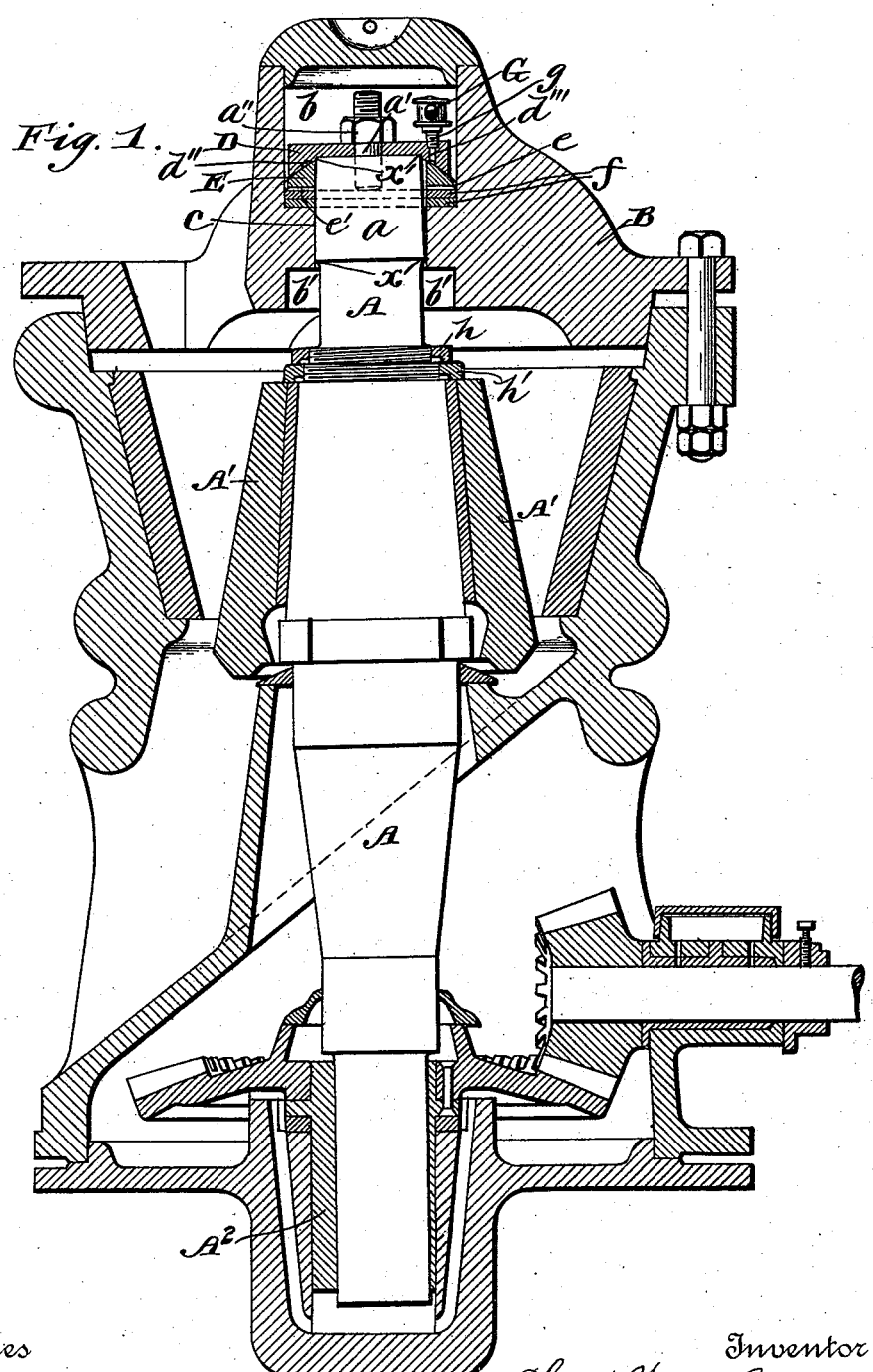
Figure 2:
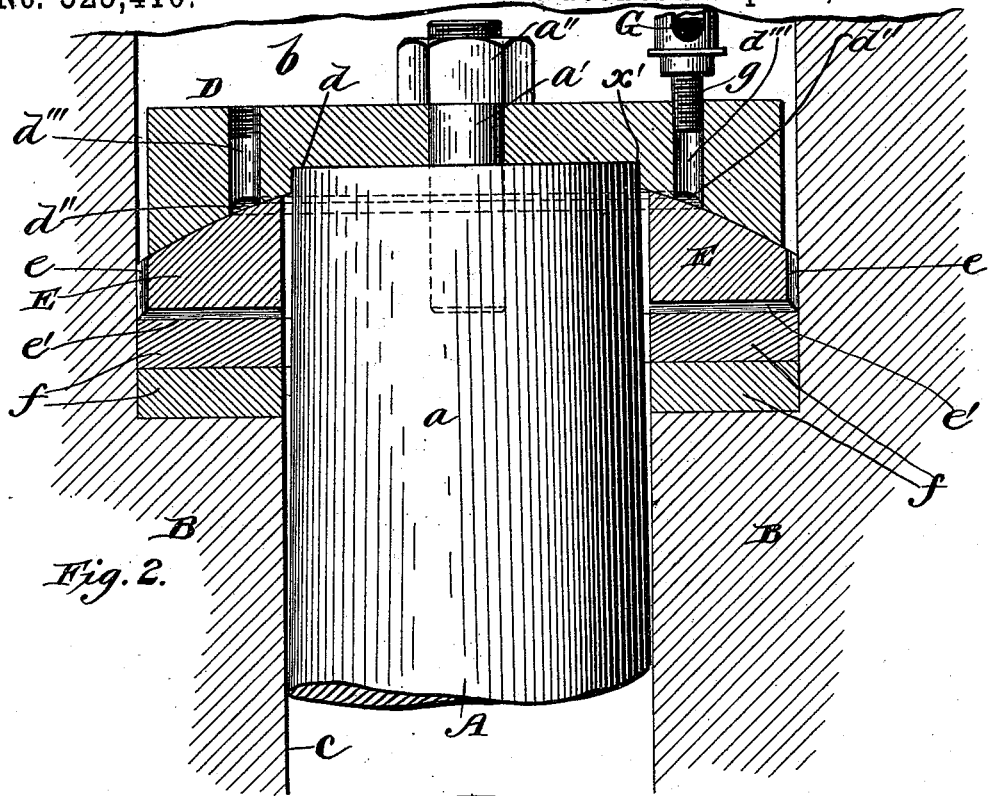
Figure 3:
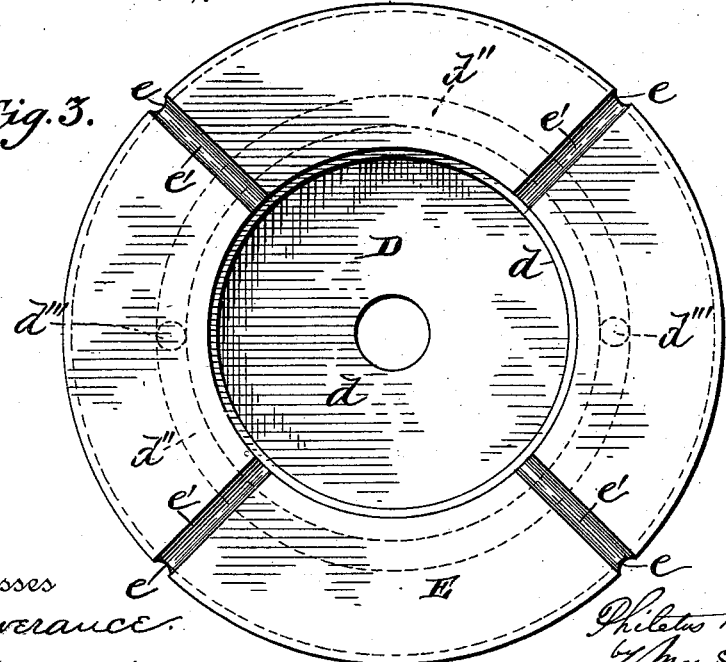

Figure 1. represents a central vertical section of a gyratory stone crusher of a known construction, with my invention applied thereto. Fig. 2. represents a detail central vertical section through my improved suspending, sustaining and supporting bearing, and Fig. 3. represents a bottom plan view of the cap supporting bearing ring.

In the drawings, A is the shaft of the gyratory stone crusher. This shaft is provided with the usual crusher head A' and has its lower end fitted in an eccentric bearing box $A^2$ operated with either toothed gearing, or a pulley and rope, or other like mechanism, but none of these devices serve at all to suspend the shaft, but only give it the required gyratory movement which is necessary in order for the crusher head to properly do its work. As before mentioned, I support the shaft at its upper end, and to do this and still allow the shaft a free gyratory movement and secure for it a solid bearing while the crushing operation is going on, I adopt the following novel construction, to wit: The spider like open work, top portion B of the crusher casing is formed with an annular recess $b$ in its upper side, and with a shallow recess $b'$ in its lower side. Within the upper recess $b$ are applied the parts D, E and $f$ for forming the suspending, supporting and sustaining bearing for the shaft. The lower recess is simply for accommodating the nuts $h$, $h'$, which secure the crusher head upon the shaft, when the shaft is raised for any purpose to that altitude. The upper journaled end of the shaft A is tapered as at $a$ from $x$ to $x'$, and this tapered portion passes through a cylindrical passage or bore $c$ connecting the recesses $b$ and $b'$. The passage or bore may be as shown, directly in the casting B or it may be formed in a separate bearing box set into the casting as is common in forming bearings. Rigidly secured within the upper end of said shaft and centrally thereof, is a screw threaded stud or projection $a'$ by means of which and a confining nut $a''$, a concave cap D, is secured to said shaft after the parts upon which it rests are set in place. This cap D rests upon the bearing ring E which has its upper side formed convex to correspond to the concave under side of the cap D which comes in contact therewith: said bearing ring rests upon one or more of the ring washers $f$ as may be required to raise the shaft and crusher head in order to vary the size to which the rock is crushed, or to compensate for wear.

The cap D is provided on its concave under side with a recess $d$ into which the end of the shaft extends and fits snugly; and thus the cap and shaft are kept from any lateral motion independently of one another. In the concave surface of the cap, outside the journal end of the shaft, is provided a shallow annular oil groove or channel $d''$ which is supplied with oil from above, by means of one or more vertical oil passages $d'''$ which are screw threaded near their upper ends to receive the screw tap $g$ of the oil cups G.

The convex bearing ring E, is provided on its periphery with vertical oil channels $e$, and on its flat under side with radial oil channels $e'$ having their outer ends coinciding in position with the lower ends of the vertical channels $e$. The inner ends of said radial channels lead to the central aperture in the bearing ring in which they are formed.

The apertures cut in the centers of the washers $f$ and the convex bearing ring E are of such diameter as to form a symmetrical continuation of the cylindrical passage $c$ in the spider like or open work top portion B, and such bearing ring and washers are of such diameter that they fit snugly into the recess $b$ and can have no lateral movement. The walls of the passage formed by the recess $c$ and the apertures cut in the washers and the bearing ring, constitute the bearing surfaces for the tapered end of the shaft. The cap D has a diameter less than that of the recess $b$ so that it may have the slight lateral movement required by its connection with the shaft. The fulcrum of the shaft will come on the line marked $x$ because the tapered end of the shaft has at all times contact with the wall of the cylindrical bearing $c$, at this point all around; and the distance from the center of the shaft on this line, and any and all points of bearing between the concave cap and the bearing ring E, will be precisely equal, so that said shaft may gyrate freely upon its fulcrum without the bearing surfaces between the cap D and the ring E jamming at any point. By this construction it will be seen that the portion of the shaft between the fulcrum point and the cap may act as a lever to freely and readily move the cap attached to the end of the said shaft, which cap because of its function in supporting the great weight of the crusher shaft and head, causes much friction in moving, especially with the gyratory movement imparted to it by the gyratory shaft. This extensive friction is further overcome by means of the perfect lubrication secured by my particular construction of the oil passages in the cap and bearing ring. The oil will pass from one or more cups G, down through the vertical oil passages $d'''$ and into the annular oil channel $d''$ from which it will gradually work its way between the surfaces of the cap D and the bearing ring E and fully lubricate them; the oil finally reaching the peripheries of said cap and ring, when it will pass down the vertical oil passages $e$ and work into the radial oil channels $e'$ and thence to the tapered portion $a$ of the shaft which works in its cylindrical casing formed by the walls of the passage $c$ and the apertures cut in the centers of the washers and the bearing ring.

By the tapered structure of the shaft end, it is allowed to move freely in the cylindrical portion of the bearing with which it comes in contact during the act of crushing, and with its fulcrum below the suspending and supporting portion of the bearing.

The taper which is imparted to the end of the shaft may be imparted to the bearing surfaces of the cylindrical casing within which said shaft end is journaled, and with this equivalent construction the operation and result of my invention will be substantially the same as with the special construction described and shown.

What I claim as my invention is—

1. In a gyratory stone crusher or breaker, the combination of a supporting frame, a crushing concave, a bearing box above the concave, an upper fulcrum near the lower end of said box, and a support for a gyratory shaft, above said fulcrum, the said shaft having an upper journal end and a suspending means attached thereto; said suspending means resting on the said support and having freedom to follow the gyrations of the journal end of the shaft, without changing its altitude; and the said suspending means, bearing box and support, being so shaped, relatively, that while the machine is crushing, a tapered space is formed all around between the periphery of the said journal end and the inner wall of said bearing box except at the point of contact of the journal end with said wall, and at the same time a parallel contact is maintained between the journal end and the bearing box, and the journal end of the shaft has, practically, an unchanging fulcrum bearing-contact between the crusher head and the suspending device, and thereby one fulcrum is made to serve for the crusher head and also the lever end which moves the suspending means, substantially as described.

2. In a gyratory stone breaker, the combination with the frame, of a gyratory shaft carrying a crusher head, mechanism for gyrating said shaft, a concave supporting bearing cap attached to said shaft, a convex bearing ring mounted in the frame and arranged to fit within and support said cap but allowed its free lateral movement, substantially as described.

3. In a gyratory stone breaker or crusher, the combination with the frame, of a gyratory shaft carrying a crusher head, and tapered at its upper end, a cylindrical casing inclosing said tapered end, a supporting bearing for said shaft located above the fulcrum point of the same, and mechanism for gyrating said shaft, substantially as described.

4. In a gyratory stone crusher, the combination with the frame, of a gyratory shaft carrying a crusher head, mechanism for gyrating said shaft, a concave supporting bearing cap attached to said shaft and provided with an annular oil channel on its under side and with vertical oil passages communicating with the same, and a convex bearing ring provided with vertical and radial oil channels, substantially as described.

5. In a gyratory stone crusher, the combination with a frame, of a gyratory shaft carrying a crusher head and having a tapered upper end, mechanism for gyrating said shaft, a concave supporting cap attached to said shaft, a convex bearing ring supporting the same, washers supporting said ring and resting in a recess of the frame, said bearing ring, washers and frame forming a cylindrical passage for receiving the tapered end of said shaft, substantially as described.

6. In a gyratory stone crusher, the combination with the frame, of a gyratory shaft carrying a crusher head, mechanism for operating said shaft, a bearing support for said shaft consisting of two members, one mounted on the shaft and the other in the frame; said members being so arranged that the bearing surfaces between them are, at all points, an equal distance from the center of the fulcrum line of the shaft, substantially as described.

In testimony whereof I hereunto affix my signature in presence of two witnesses.

PHILETUS WARREN GATES.

Witnesses:
HENRY W. HOYT,
ALBERT JUSTIN GATES.